Fig.3.

Oct. 29, 1957   W. A. FLETCHER ET AL   2,811,058
WORKPIECE HANDLING DEVICE
Filed Oct. 18, 1952   8 Sheets-Sheet 4

Fig. 4.

INVENTORS
WILLIAM A. FLETCHER
BY MAX E. TODD
Willets Harding
their ATTORNEYS

Oct. 29, 1957   W. A. FLETCHER ET AL   2,811,058
WORKPIECE HANDLING DEVICE
Filed Oct. 18, 1952   8 Sheets-Sheet 5

INVENTORS
WILLIAM A. FLETCHER
BY MAX E. TODD their ATTORNEYS

Oct. 29, 1957   W. A. FLETCHER ET AL   2,811,058
WORKPIECE HANDLING DEVICE

Filed Oct. 18, 1952   8 Sheets-Sheet 6

INVENTORS
WILLIAM A. FLETCHER
BY MAX E. TODD their ATTORNEYS

INVENTORS
WILLIAM A. FLETCHER
BY MAX E. TODD their ATTORNEYS

Oct. 29, 1957 W. A. FLETCHER ET AL 2,811,058
WORKPIECE HANDLING DEVICE
Filed Oct. 18, 1952 8 Sheets-Sheet 8

INVENTORS
WILLIAM A. FLETCHER
BY MAX E. TODD
their ATTORNEYS

United States Patent Office 2,811,058
Patented Oct. 29, 1957

2,811,058
WORKPIECE HANDLING DEVICE

William A. Fletcher, Daleville, and Max E. Todd, Windfall, Ind., assignors to General Motors Corporation, Detroit, Mich., a corporation of Delaware Application October 18, 1952, Serial No. 315,477

6 Claims. (Cl. 78—96)

This invention relates to improvements in materials handling mechanism.

It is among the objects of the present invention to provide a materials handling mechanism with means operative automatically to place a workpiece in the die mechanism preparatory to die forging of a part thereof and to remove said workpiece from the die mechanism when the die forging operation is completed.

Further objects and advantages of the present invention will be apparent from the following description, reference being had to the accompanying drawings wherein a preferred embodiment of the present invention is clearly shown.

The die mechanism is designed and constructed to die forge a portion of a cylinder workpiece so as to reduce the outer diameter of the said portion. Initially the cylinder workpiece is of predetermined length and has a certain cross-sectional thickness. Die forging the one end portion of this workpiece so as to decrease its outer diameter displaces metal whereby the overall length of the workpiece is substantially increased after the die forging treatment is completed.

These cylindrical workpieces are of considerable size and weight, forming the metal frames of generators or motors. To facilitate handling of these workpieces and the commercial production thereof, the machine embodying the die forging die mechanism is equipped with shifter arms automatically operative in timed sequence, one to deliver a cylindrical workpiece to the die mechanism, the other to remove the die forged cylindrical workpiece from the die mechanism and deliver it to a chute for transfer to another machine. In this machine the operator merely places a cylindrical workpiece upon a platform and the operating machine then takes over and finally discharges the die forged workpiece upon the transfer chute.

Figure 1:
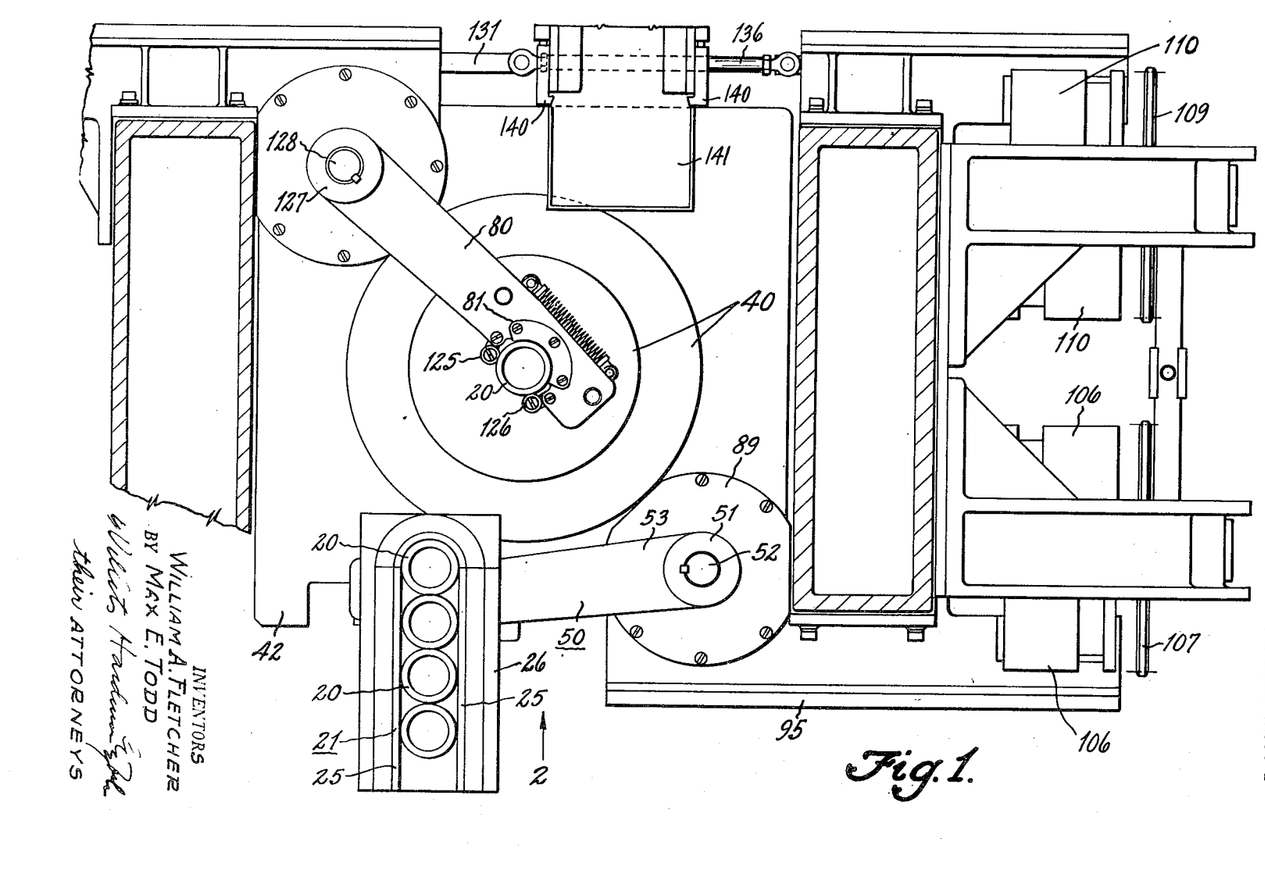
Fig. 1 is a top view of the machine.
Figure 2:
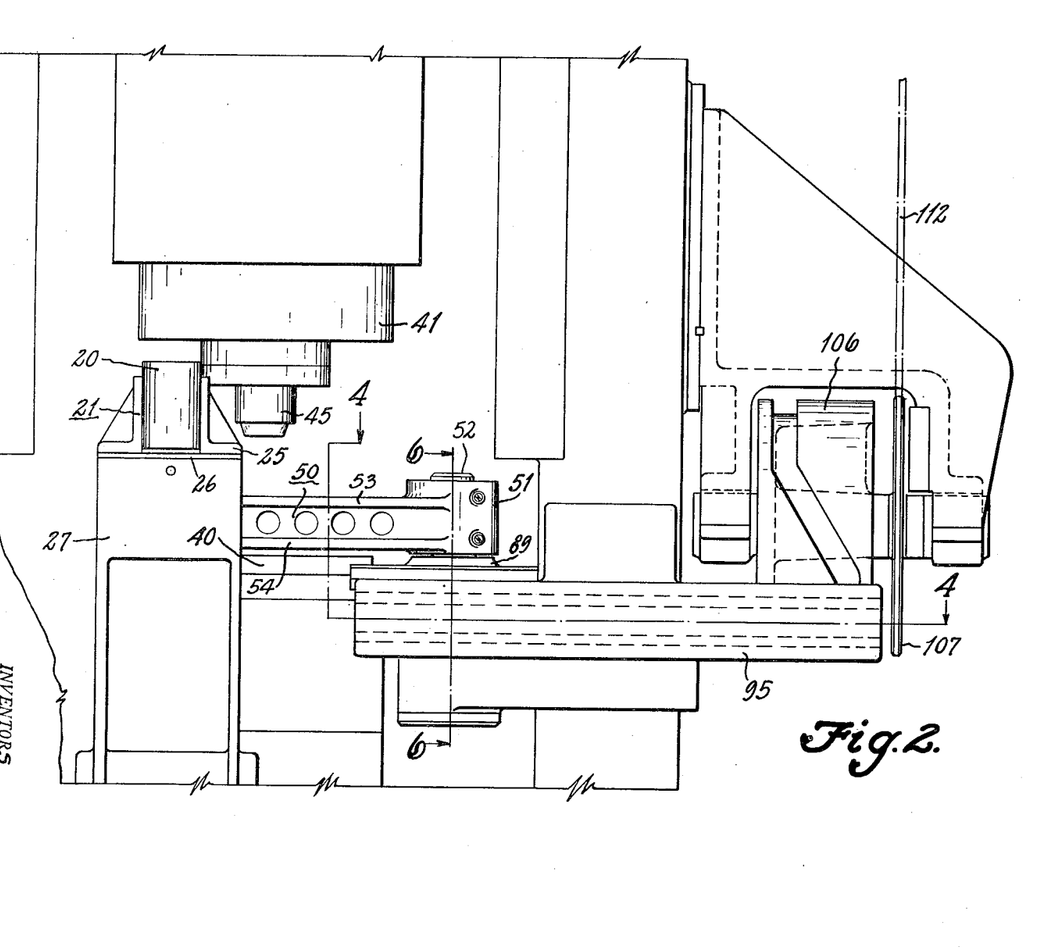
Fig. 2 is a front view of a portion of the machine.
Figure 3:
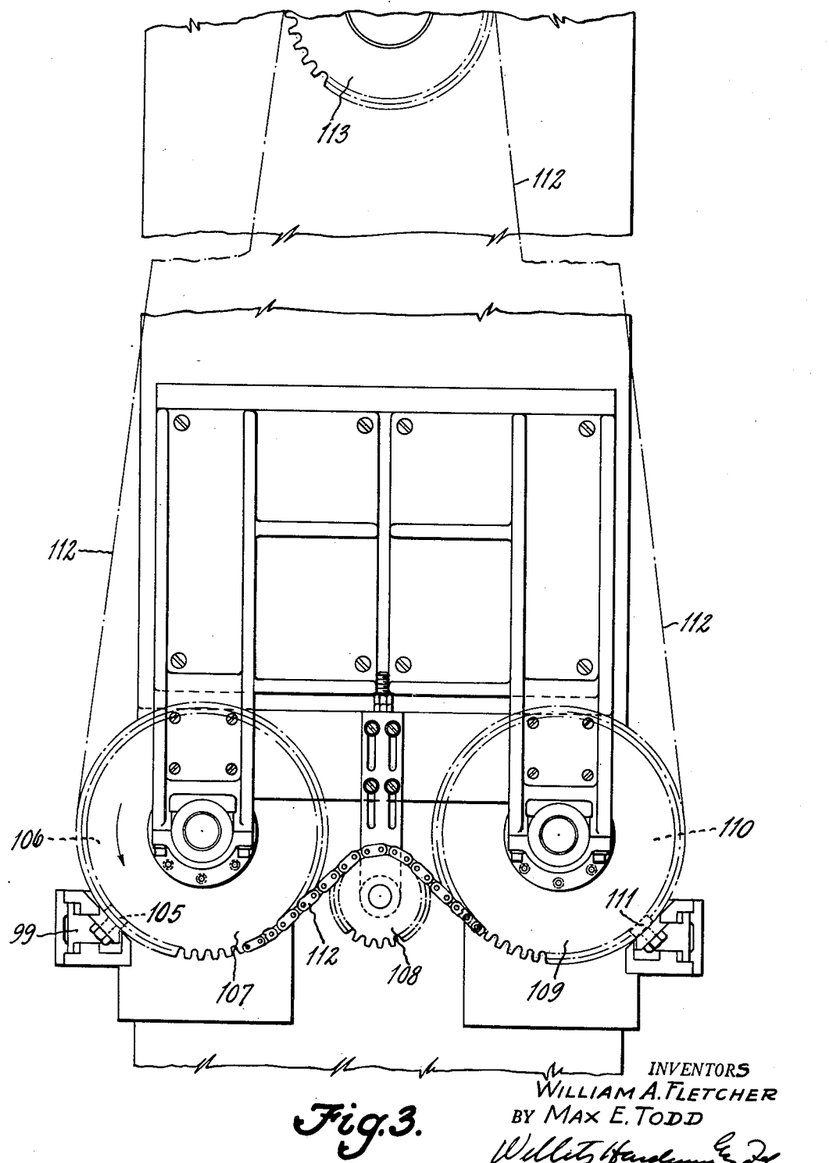
Fig. 3 is a side view of a portion of the machine.
Figure 10:
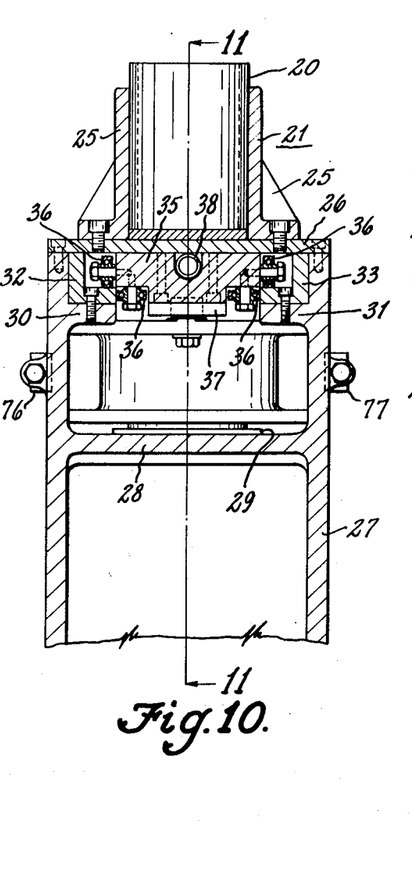
Fig. 10 is a sectional view taken along the line and in the direction of the arrows 10—10 of Fig. 11. It illustrates the construction of the shiftable platform engageable by one of the shifter arms.
Figure 11:
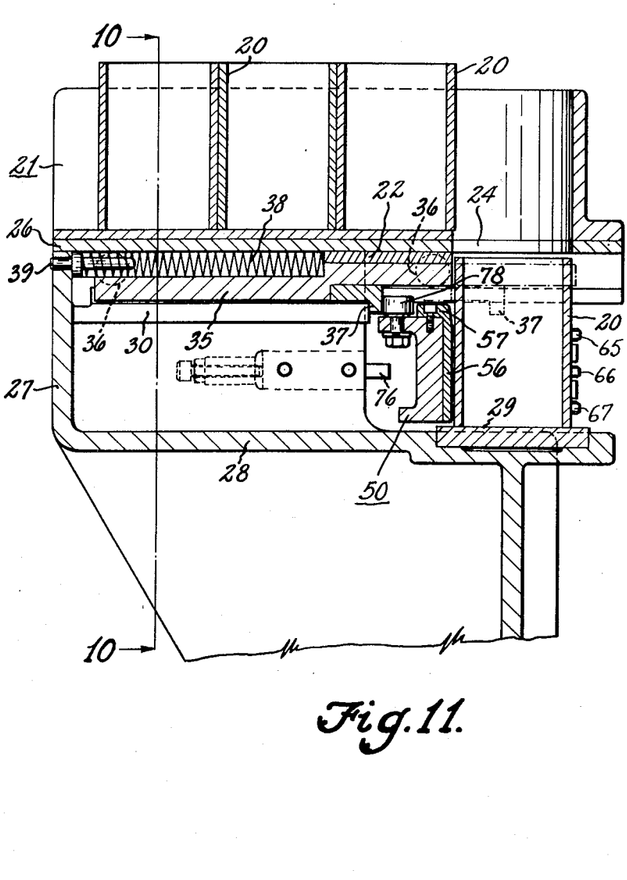
Fig. 11 is a sectional view taken along the line and in the direction of the arrows 11—11 in Fig. 10.
Figure 12:
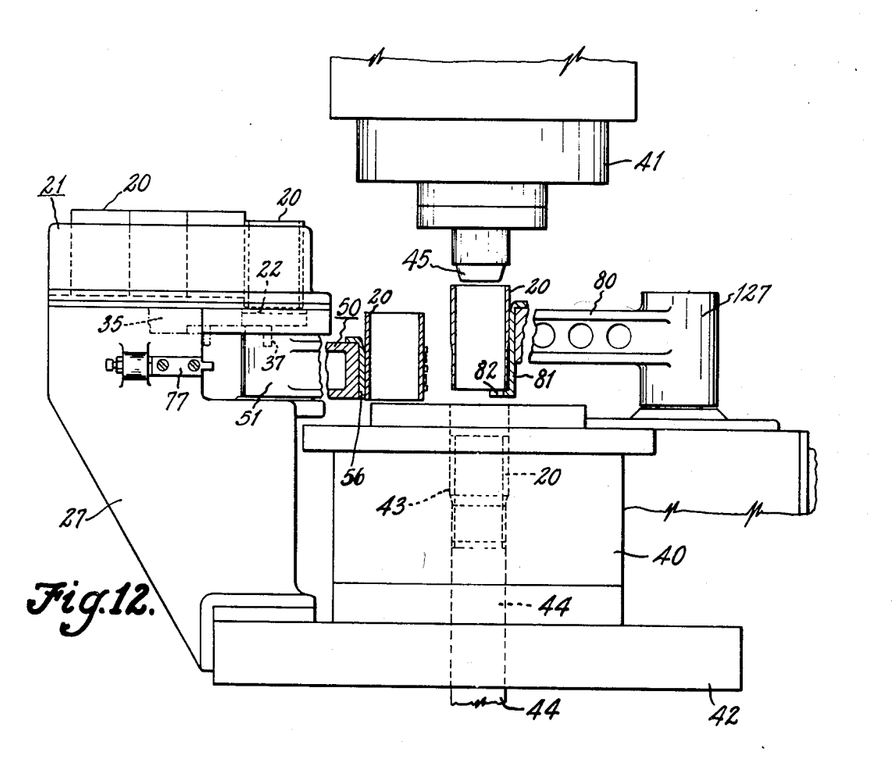
Fig. 12 is a view of the machine, partly in section and showing one arm grasping a cylinder workpiece to be delivered to the die and the other arm grasping a die forged cylinder workpiece ready for removal from the die mechanism.
Figure 13:
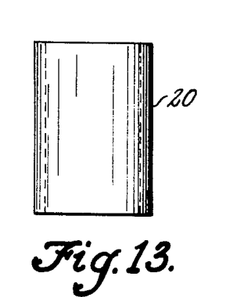
Fig. 13 shows a cylinder workpiece to be die forged.

Referring to the drawings, the Fig. 13 shows the cylindrical workpiece 20 of predetermined diameter, length and wall thickness. As shown in Fig. 1, workpieces 20 are placed in a row on the stationary chute 21 and pushed forward by the operator so that the leading workpiece 20 rests upon the shiftable platform 35. (See Figs. 10, 11 and 12.) This platform is spring urged into its normal position (dotted lines Fig. 12) in which it provides a bottom for an opening 24 at the end of the chute 21 (Fig. 11) upon which the leading cylindrical workpiece rests. In the present machine chute 21 is made up of two side plates 25 secured to a base plate 26 which in turn is attached to the upper side of a stanchion 27 secured to the main body of the machine. As shown in Figs. 10 and 11 stanchion 27 has a partition 28 forming a horizontal platform in which a hardened disc plate 29 is secured directly beneath the opening 24 in the bottom of chute 21. Two shelves 30 and 31 extending inwardly in the stanchion, toward each other, each have a hardened metal track-way 32 and 33 respectively attached thereto.

A shiftable member 35 has ball-bearing rollers 36 attached to the opposite sides and bottom thereof, said rollers riding upon the top and edge surfaces of the respective track-ways 32 and 33 thereby movably supporting member 35 so that it may be shifted back and forth upon said track-way. The platform 22 of hardened metal is supported on the shiftable member 35. Another member providing a depending lip 37 is also attached to said shiftable member 35. A longitudinal recess in the top of member 35 houses a spring 38 one end of which engages the said member 35, the other an abutment plug 39 secured in the stanchion. This spring 38 constantly, yieldably urges the shiftable member 35 forwardly so that the platform 22 thereon covers opening 24 in chute 21 and provides a bottom upon which the leading cylindrical workpiece 20 may be placed. The shiftable member 35 is shown in its fully retracted position in Fig. 11, being held there by the one shifter arm as will later be described. The extended position of this member 35, in which the platform 22 thereon forms the closure for opening 24, is shown in dot and dash lines in Fig. 11.

Figure 14:
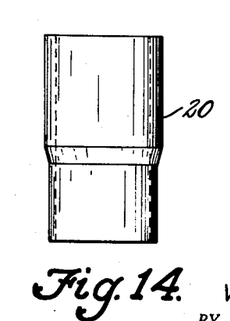
Fig. 14 shows the completed, die forged cylinder workpiece.

The die mechanism of the present machine consists of a stationary die block 40 and a cooperating movable die block 41 which is reciprocated by any suitable means usually employed for this purpose. The stationary die block 40 is mounted upon and secured to the base plate 42 of the machine to which stanchion 27 is also attached. This block 40 has a recess 43 contoured so that when a cylindrical workpiece 20 as shown in Fig. 13 is forced into said recess by the movable die block or punch 41, said workpiece will be cold die forged to assume a shape as shown in Fig. 14 so that the workpiece is substantially elongated and reduced in outside diameter for a portion of its length. An ejector 44, power actuated in any suitable manner is engageable with the die forged workpiece for pushing said finished workpiece from the stationary die block while being engaged by the pilot end 45 of the movable die block or punch 41 which extends into the workpiece and fits sufficiently tight therein as to support the workpiece after it is moved entirely out of the die block 40 and the ejector 44 is retracted into said die block, away from the workpiece.

Figures 7, 8, 9:
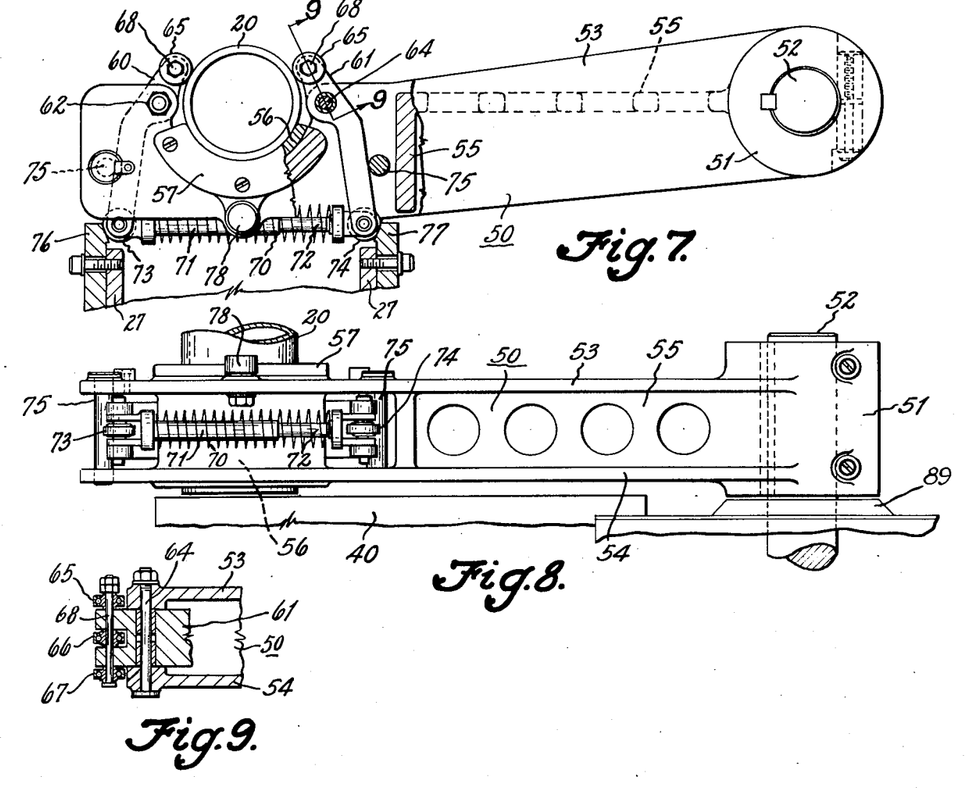
Fig. 7 is a plan view of one of the shifting arms of the machine, a portion thereof being broken away to show details of construction.
Fig. 8 is a side view of the arm shown in Fig. 7.
Fig. 9 is a detail sectional view taken along the line and in the direction of the arrows 9—9 in Fig. 7.

As previously mentioned, pivoted arms are operative to deliver workpieces to and remove finished workpieces from the die mechanism of the machine. The arm which delivers workpieces to the die mechanism for die forging purposes is designated by the numeral 50. As shown in Figs. 7, 8 and 9, arm 50 has a hub 51 pivotally supported by the stub shaft 52. The arm 50 consists of two spaced, parallel web portions 53 and 54 secured together and strengthened by a web 55. The end of the arm web portions 53 and 54 have aligned semicircular recesses in which the body portion of a segmental, arcuated cuff 56 is seated. This cuff having an angular flange 57 which is attached to the upper web 53 of the arm. The inner curved surface of the cuff 56 coincides with the outer annular surface of the cylindrical workpiece 20 as shown in Fig. 7. To grasp said workpiece and hold it nested in said cuff as shown in Fig. 7, pivoted levers or fingers 60 and 61 are carried by arm 50. Finger 60 is pivoted on bolt 62 attached to webs 53 and 54 of arm 50. Finger 61 is pivotally supported by bolt 64 shown in Fig. 9 to be attached to both webs 53 and 54 of arm 50. At the one end of fingers 60 and 61 rollers 65, 66 and 67 are respectively supported by a pin 68, these rollers are adapted to engage and grasp the workpiece 20. The rollers are under the influence of a spring 70 surrounding a connector consisting of telescopically engaging members 71 and 72, the former being pivotally attached to the end of finger 60 opposite pin 68 thereon while member 72 is pivotally attached to the corresponding end of finger 61. A roller 73 is carried by the finger 60 where member 71 is pivotally attached thereto and a similar roller 74 is likewise provided on the finger 61. Spring 70 constantly, yieldably urges the fingers 60 and 61 to move their ends carrying rollers 65, 66 and 67 respectively toward each other for the purpose of grasping a workpiece. Stationary stop pins 75 limit the range of movements of fingers 60 nad 61 under the influence of spring 70. When the arm 50 is in its normal, retracted position as shown in Figs. 1 and 7, rollers 73 and 74 respectively engage the cam blocks 76 and 77 attached to stanchion 27, see Fig. 12, in such relative positions as to move the rollers 73 and 74 on said fingers toward each other against the effect of spring 70 and thus move the rollers 65, 66 and 67, at the opposite ends of the respective fingers 60 and 61, apart and spaced from a workpiece 20 adjacent cuff 56. A bumper block 78 is rigidly attached to arm 50 substantially midway of the ends of cuff flange 57.

As aforementioned, this machine is equipped with two arms, the one marked 50 being the arm which delivers the workpieces to the die mechanism, the other arm 80 being the workpiece removing arm being substantially like arm 50 with the exception that its cuff 81 has an inwardly extending, arcuate flange 82 at its lower end for supporting the workpiece grasped thereby. (See Fig. 12.) Each arm 50 and 80 is oscillated by a gear actuated by a reciprocative rack, said gear being attached to a stub shaft to which the hub of the arm is keyed. The shafts and gear of both arms are alike and thus, for the sake of brevity, the shaft and gear of arm 50 shown in detail in Fig. 6 will be described.

Figure 4:
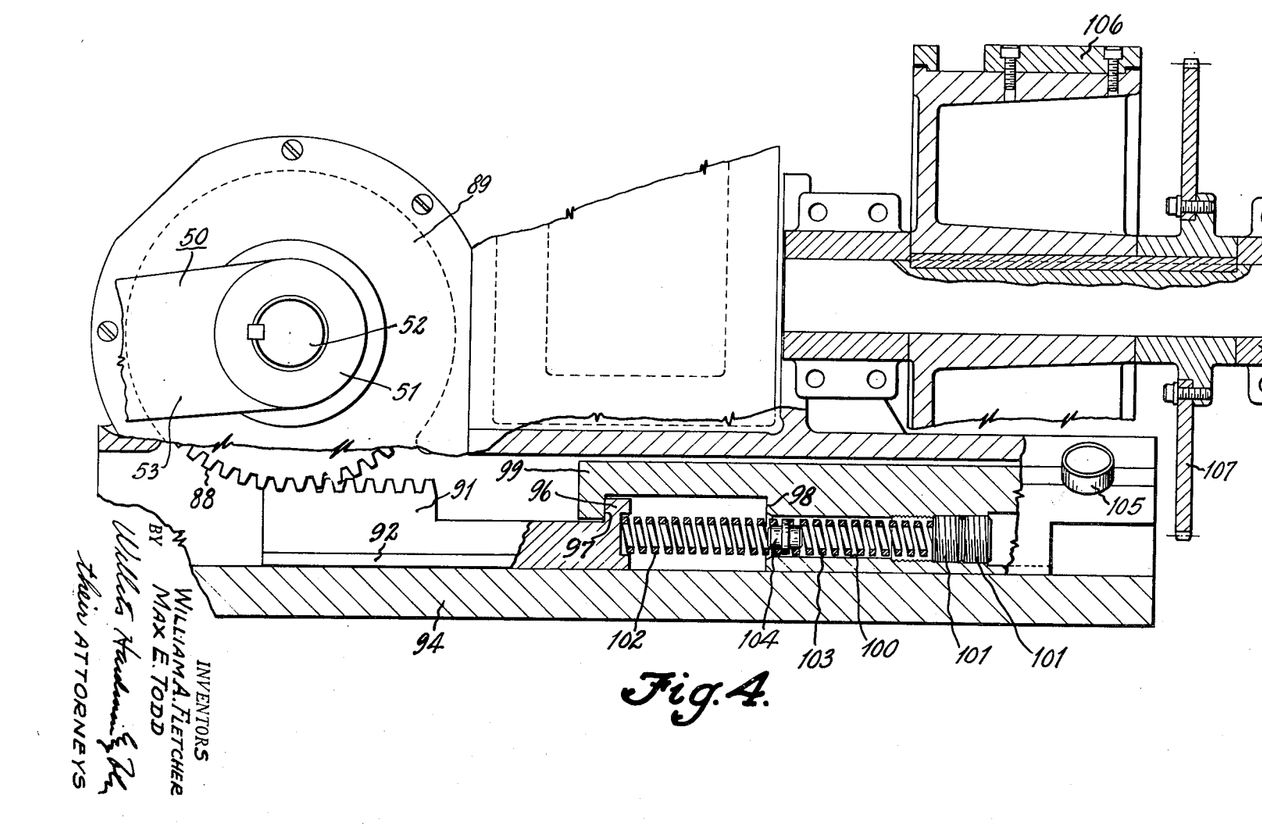
Fig. 4 is a fragmentary sectional view of the machine taken along the line and in the direction of the arrows 4—4 in Fig. 2.
Figures 5, 6:
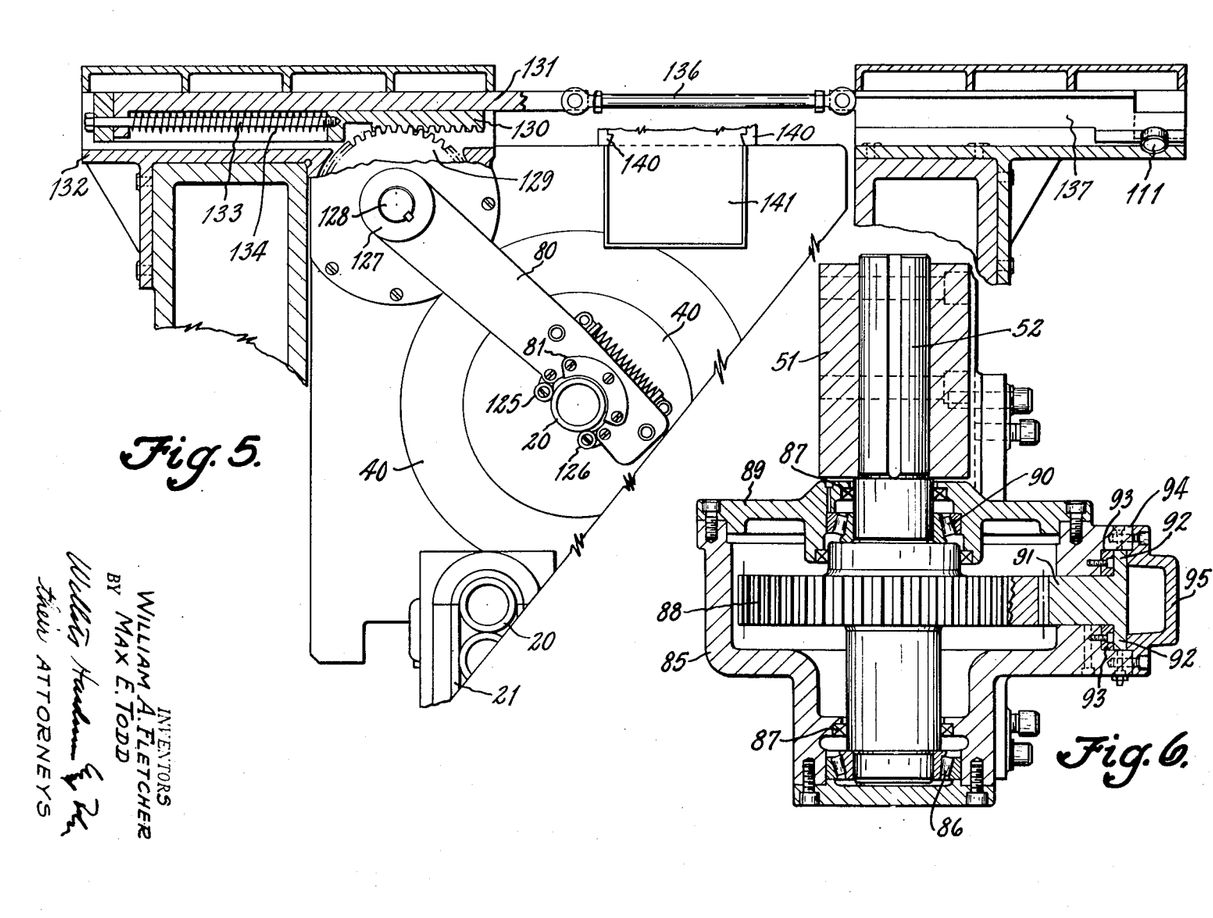
Fig. 5 is a fragmentary view of the mechanism shown in Fig. 1, certain parts being shown in section to show interior construction.
Fig. 6 is a fragmentary sectional view taken along the line and in the direction of the arrows 6—6 in Fig. 2.

The cup-shaped housing 85 is rigidly secured to or is formed integral with the main body of the machine. The inner end of shaft 52 is rotatably supported by the roller bearing 86 within housing 85, a sealing ring 87 surrounding the shaft and preventing excessive leakage of lubricant from the portion of the housing in which gear 88, attached to or forming a part of shaft 52, is located. A cover plate 89 is secured to the upper portion of housing 85 said cover plate carrying a roller bearing 90 which also supports shaft 52 extending outside of the housing to permit the hub 51 of arm 50 to be keyed thereto. A sealing ring 87 in cover 89 prevents leakage of lubricant through bearing 90. As shown in Figs. 4 and 6, gear 88 is operatively engaged by a toothed rack 91 which has oppositely disposed, outwardly extending flanges 92 slidably engaging tracks 93 secured within the elongated extension 94 of housing 85. A cover 95 is attached to housing 85 and its extension 94, said cover holding the flanges 92 on the rack upon the tracks 93. Fig. 4 shows the rack 91 as having an extending abutment member 96 which is movable between the end walls 97 and 98 of a recess in the actuator 99 which is reciprocatively supported within the housing extension 94. Actuator 99 has a longitudinal passage 100 part of which is interiorly threaded to receive screw plugs 101. A pair of compression springs 102 and 103 with an abutment button 104 interposed therebetween extend into said passage, spring 103 engaging the inner plug 101 and spring 102 engaging the end of rack 91 which is slidably supported in the recess in actuator 99. These springs 102 and 103 may be of equal rate or also one may have a greater compression rate than the other dependent upon the desired action of said springs which coact yieldably to urge the rack 91 forwardly so that extension 96 on said rack engages the end wall 97 of the recess in the actuator 99. A cam follower 105 extends from the actuator 99 and into the camming recess of the barrel cam 106 rotation of which reciprocates the actuator 99 within the housing extension 94. Barrel cam 106 is rotated by a sprocket 107 engaged by a chain 112 passing over idler sprocket 108, sprocket 109 connected to the barrel cam 110, similar to cam 106. Barrel cam 110 is engaged by a cam follower 111 which is mounted upon the actuator for operating shifter arm 80. The chain 112 is driven by sprocket 113 connected to the power device which provides the motive power for the entire machine. The spring loaded lost motion connection between the rack 91 and the actuator 99 causes gear 88 and consequently arm 50 to be operated through its workpiece delivery under the influence of the springs 102 and 103 which may be compressed to avoid damage if for any reason the workpiece would cause the machine to stall. The return to normal position of the empty arm 50 will, however, be positive since actuator 99 directly contacts the abutment 96 on the rack during this phase of machine operation.

The arm 80 is substantially like arm 50 having spring loaded workpiece grasping fingers 125 and 126 normally urged to grasp a workpiece as shown in Fig. 5. The hub 127 of arm 80 is keyed to a shaft 128 which, like shaft 52 has a gear 129 attached thereto and actuated by a rack 130. This rack 130 and a contiguous actuator 131 are reciprocatively carried within a housing 132. A pin 133 has one end attached to the actuator 131 and slidably extends through openings in the actuator 131 and housing 132. A spring 134 surrounds pin 133 and abuts against the actuator 131 and the rack 130 normally urging the rack 130 forwardly so that it rotates gear 129 to move the arm 80 from its normal position into its workpiece grasping position adjacent the axis of the die mechanism as shown in Fig. 5. This movement of the rack 130 is actually effected by the reciprocation of actuator 131 forwardly acting through the spring 134 to move the rack forwardly and thus the arm clockwise as regards Fig. 5. If for any reason such movement of the arm 80 is resisted, then continued movement of the rack under power would compress spring 134 and prevent damage. Actuator 131 has one end of a link 136 attached thereto, the other end of the link being connected to the reciprocation block 137 having a follower 111 thereon which extends into the endless camming groove in the barrel cam 110.

Stationary camming posts 140 are attached to the machine, said posts being engageable by the ends of grasping fingers or levers 125 and 126 on arm 80 for actuating said fingers to separate and release the workpiece 20 so that it may drop from said arm into the chute 141 which delivers the finished workpieces to any desirable location for further processing.

All operating parts of this machine are actuated in properly timed sequence arm 50 being moved through its workpiece delivery stroke while the die mechanism is at rest or idle and while the arm 80 is remote from the center area of the die mechanism. While the die mechanism is active arm 50 returns to its normal position and arm 80 starts its approach to the workpiece pick-up position. Arm 80 does not engage the workpiece until the finished workpiece is retracted from the stationary die.

While the ejector is being retracted into the stationary die block and the finished work piece still held suspended from the movable die block, fingers 125 and 126 are brought into grasping engagement with the workpiece, holding it while the movable die is removed from the workpiece after which movement of arm 80 is effected to return it to normal position where posts 140 actuate the fingers 125 and 126 to release the workpiece and permit it to drop upon the chute 141.

To start the workpiece through the machine the operator places it on chute 21 and by pushing it forward the workpiece finally is located on the shiftable platform 22 which forms the bottom for the opening 24 in said chute 21. When arm 50 approaches its normal position the bumper block 78 thereon engages lip 37 and moves the shiftable member 35 with the platform thereon so that said platform completely uncovers opening 24 when arm 50 has reached its normal position whereby the workpiece formerly on said platform, drops upon the plate 29 and directly in front of the arm 50 so that when said arm starts on its workpiece loading or delivery movement the workpiece will engage and be nested in the cuff 56 carried at the free end of the arm 50. As soon as arm 50 has moved from its normal position rollers 73 and 74 on the fingers 60 and 61 of arm 50 will disengage the respective cam posts 76 and 77 and permit spring 70 to actuate the fingers so that they will grasp the workpiece and securely hold it as the arm moves forward to position said workpiece in coaxial alignment with the die mechanism said fingers holding the workpiece until the pilot end 45 of the movable die enters the workpiece to start it on its way into the stationary die block 40.

The present invention provides sturdy mechanism for automatically grasping and delivering comparatively heavy workpieces in proper position to a die mechanism and after the die forging is accomplished by said die mechanism the workpiece again is grasped and then removed from the machine, all in continuous, properly timed sequence.

While the embodiment of the present invention as herein disclosed, constitutes a preferred form, it is to be understood that other forms might be adopted.

What is claimed is as follows:

1. An apparatus for feeding cylindrical members to a work station comprising in combination; a shiftable platform whereon a plurality of cylindrical members may be successively placed in a horizontally aligned and in an upright position, a pivotable arm operative, when moved to a normal position, to engage and shift said platform for vertically dropping one of said members into juxtaposition to said arm while said member is maintained in an upright position, means on said arm for gripping said member while said member is in said upright position when said arm is pivoted from said normal position while said arm horizontally moves said member into alignment with a work station and means for releasing said gripping means while said member is in alignment at said work station.

2. An apparatus for feeding cylindrical members to a work station comprising in combination; a shiftable platform whereon a plurality of members are successively placed in a horizontal alignment and in an upright position, a pivotable arm operative, when moved to a normal position, to engage and shift said platform for vertically dropping one of said members into juxtaposition with said arm while the upright position of said dropped member is maintained, means on said arm for gripping said member while said member is in said upright position when said arm is pivoted from said normal position while said arm horizontally moves said member into alignment with a work station, means for releasing said gripping means when said member is in alignment at said work station, a second pivotal arm movable from a normal position into engagement with said member after said member has been operated upon at said work station, means on said second arm for gripping said member while said member is in said upright position while said second arm horizontally moves said member from said work station toward said normal position, and means operable when said second arm is in its normal position for releasing said gripping means to release said member whereby said member vertically drops from said gripping means when said arm is in said normal position.

3. In combination, a slidable platform yieldably urged into normal position for receiving and supporting a cylindrical member when said member is in an upright position; a pivoted lever operative, when moved toward a normal position, to engage and positively actuate and slide said platform for permitting the cylindrical member to drop into position in front of said lever, spring loaded fingers on said lever operative to grip and hold the cylindrical member in an upright position as the lever is pivoted to horizontally move said member into alignment with a work station and to hold said member while said member is operated on in said work station, means for releasing said fingers after said operation is performed at the work station and for returning said lever to its normal position, a second pivoted lever movable out of normal position into engagement with said member while said member is in said work station, means on said second lever for supporting and gripping the cylindrical member and for releasing said member when the said second lever has been moved into its normal position; and means for actuating said levers in timed sequence.

4. A device in accordance with claim 3 in which each lever is oscillated by a rack and pinion mechanism actuated by a barrel cam, the pinion being operatively connected to the lever and the rack to a follower engaging the cam, said rack having a compression spring interposed between it and the cam follower whereby the rack is operated in one direction through said spring.

5. A device in accordance with claim 3 in which each lever is oscillated from and into a normal position by a rack and pinion mechanism, the pinion being operatively connected to the lever, the rack being connected to a follower cooperating with a barrel cam, said rack connection consisting of a lost motion joint urged into one extreme position by a compression spring, whereby the lever is positively actuated toward its normal position and through a yieldable spring away from its normal position.

6. A device in accordance with claim 2, in which the cylindrical member gripping means on each pivoted arm consists of two oppositely disposed levers pivotally attached to the respective arm intermediate their ends each of which has a roller attached thereto, the two corresponding ends of the levers on an arm having a compression spring interposed therebetween which yieldably urges the other ends of said levers together to grasp a cylindrical member, the ends with the spring therebetween being engageable with stationary camming stops adjacent the normal positions of the respective arms for actuating the levers on said arms to separate the free ends of said levers.

References Cited in the file of this patent

UNITED STATES PATENTS

| | | |
|---|---|---|
| 222,933 | Moore | Dec. 23, 1879 |
| 230,638 | King | Aug. 3, 1880 |
| 1,073,607 | Kennedy | Sept. 23, 1913 |
| 1,856,290 | Prussing | May 3, 1932 |
| 2,059,379 | Marien et al. | Nov. 3, 1936 |
| 2,217,333 | Dahlman | Oct. 8, 1940 |
| 2,327,849 | Wolfe | Aug. 24, 1943 |
| 2,350,425 | Spaulding et al. | June 6, 1944 |
| 2,372,706 | Blair | Apr. 3, 1945 |

FOREIGN PATENTS

| | | |
|---|---|---|
| 600,280 | Germany | July 20, 1934 |
| 607,929 | Germany | Jan. 11, 1935 |